United States Patent
Meintrup et al.

[11] Patent Number: 5,988,618
[45] Date of Patent: Nov. 23, 1999

[54] WORK-HOLDING DEVICE

[75] Inventors: Hubert W. Meintrup; Stefan Schwock, both of Stuttgart, Germany

[73] Assignee: Matrix GmbH Spannsysteme und Produktionsautomatisierung, Stuttgart, Germany

[21] Appl. No.: 09/014,057

[22] Filed: Jan. 27, 1998

[30] Foreign Application Priority Data

Jan. 27, 1997 [DE] Germany ............... 197 02 848

[51] Int. Cl.⁶ .................................................. B25B 1/24
[52] U.S. Cl. ................................................... 269/266
[58] Field of Search ....................... 269/266, 25, 309, 269/310

[56] References Cited

U.S. PATENT DOCUMENTS

| | | | |
|---|---|---|---|
| 4,572,564 | 2/1986 | Cipolla | 269/266 |
| 4,752,063 | 6/1988 | Nagy | 269/266 |
| 5,407,185 | 4/1995 | Zehnpfennig | 269/266 |
| 5,690,323 | 11/1997 | Puttmer et al. | 269/266 |

*Primary Examiner*—David A. Scherbel
*Assistant Examiner*—Daniel G. Shanley
*Attorney, Agent, or Firm*—Womble Carlyle Sandridge & Rice, PLLC

[57] ABSTRACT

A work-holding device is provided for clamping a workpiece of irregular shape. The work-holding device has a clamping jaw. The clamping jaw comprises a multitude of clamping pins (3). The clamping pins (3) are circular in cross section, aligned in parallel and laterally directly adjacent to one another, and separately movable in their direction of main extension. The clamping jaw also comprises a frame laterally encompassing the clamping pins (3). The clamping jaw further comprises an open pressure chamber (17) provided at the backside of said clamping pins (3) turned away from said workpiece. Pressure medium (16) is supplied to the pressure char, parts of which emerge from said pressure chamber (17) to said workpiece through clearances between said clamping pins (3); and the pressure medium (16) in the pressure chamber impinges said clamping pins (3) in direction towards the workpiece.

12 Claims, 5 Drawing Sheets

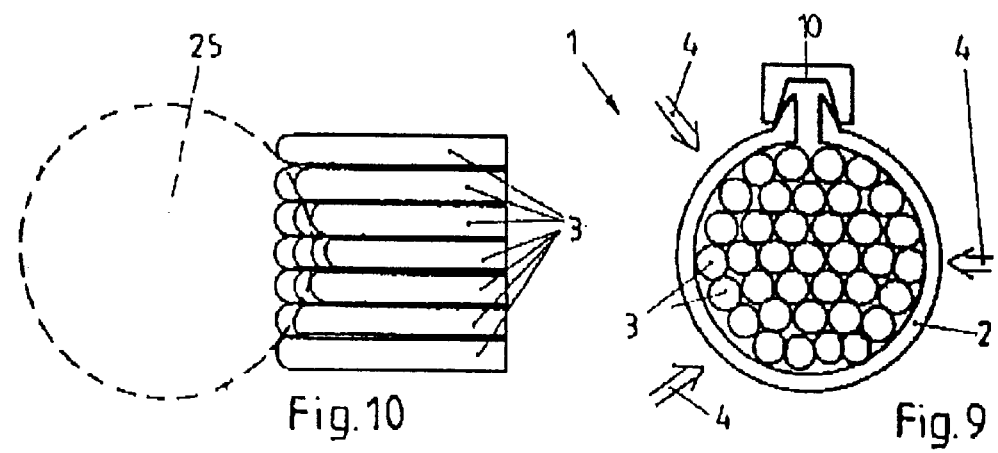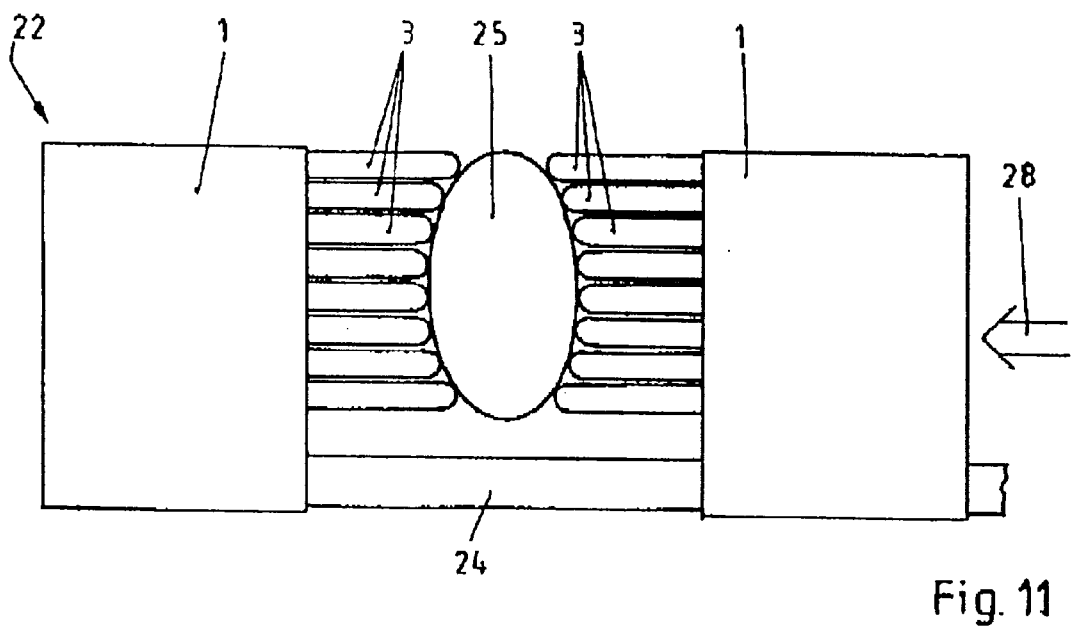

WORK-HOLDING DEVICE

FIELD OF THE INVENTION

The invention relates to a work-holding device for workpieces, which has one or two clamping jaws comprising a multitude of clamping pins arranged in parallel. Such work-holding devices are provided for workpieces of irregular surfaces.

BACKGROUND OF THE INVENTION

A work-holding device having a clamping jaw with a multitude of clamping pins is known from Australian Patent No. 117,458. The clamping pins, which are circular in cross section and which are laterally encompassed by a frame, do not fill the frame completely. Several clearances exist in the neighbourhood of each clamping pin. When fixed to each other and to the frame by a lateral fixing force, the clamping pins show line shaped contact areas. With this arrangement, debris, which penetrates between the clamping pins, will be removed into the clearances between the clamping pins with applying the fixing force. Thus, the debris does not hinder the fixing of all of the clamping pins with regard to the frame by means of the fixing force, as long as it can be received by the clearances. The limited contact area of the clamping pins is uncritical for a sufficient non-positive connection of the clamping pins. On the contrary, elastic deformations of the clamping pins, which can occur when applying higher fixing forces, may support the fixing of the clamping pins with regard to the frame by way of a kind of positive connection. Additionally, the clamping pins with the circular cross section are easily manufacturable, for example by means of cutting-off to length appropriate bars of round bar steel. The fixing device of the known work-holding device applies the fixing force on a wall of the rectangular shaped frame, which, opposite to the other walls of the frame, is movable perpendicularly to the direction of main extension of the clamping pins. The fixing force is exerted by means of a fixing screw supported on the other walls of the frame. A clamping mechanism for applying a clamping force on the clamping jaw as a whole comprises a stationary but pivoted spindle passing through a tapped hole in the clamping jaw.

A work-holding device having a clamping jaw with a multitude of clamping pins is also known from U.S. Pat. No. 2,754,708. Here, the clamping pins are hexagonal in cross section. The clamping pins are packed up in the frame go that they fill up the frame completely, aside from the border region of the packing. Here also, the clamping pins are fixed with regard to each other and with regard to the frame by means of a movable wall of the frame, to which the fixing force is applied by a fixing screw. At their backsides, the clamping pins are connected with retaining bars, which pass through a through-drilled retaining plate and which are provided with a retaining collar behind the retaining plate. Helical compression springs are arranged on the retaining bars, which push the clamping pins away from the retaining plate forward to the workpiece. The clamping mechanism here also comprises a stationary but pivoted spindle passing through a tapped hole in the clamping jaw. During actual use of the work-holding device according to U.S. Pat. No. 2,754,708 it turns out, that the work-holding device reacts very sensitive to debris. In the case of penetration of any debris between the clamping pins, the lateral fixing force acts no more on all of the clamping pins, but it is borne by definite clamping pins only. The result is, that single clamping pins or total regions of clamping pins are not fixed with regard to the frame by means of the lateral fixing force.

The British Patent 595,803 discloses a holding device with two clamping jaws, which are horizontally divided into single clamping elements. Pressure chambers, to which oil pressure is admitted, are provided behind the clamping elements. The pressure in the pressure chambers pushes the single clamping elements forward and carries them. The pressure chambers of both clamping jaws known from the vice according to British Patent 595,803 are jointed together. A mobility of the whole clamping jaws against each other is not provided. Instead, pressure is applied on the communicating but principally closed pressure chambers for clamping a workpiece. However, no definite position of the workpiece clamped in the vice is achieved herein because in case of a displacement of the workpiece in clamping direction of the vice no rise of the pressure occurs as a reactio. One pressure chamber displaces exactly as much oil as it can flow after into the other pressure chamber. The same applies for twisting the workpiece in a plane, in which the single clamping elements of both clamping jaws are arranged side by side.

Work-holding devices for workpieces with a plurality of parallel and separately movable clamping elements are also known from German Patent 19 29 830 and German published Patent Applications 42 39 180 and 39 27 773.

U.S. Pat. No. 4,200,272 discloses a work holder for locating a workpiece of irregular shape during treatment. Said holder comprises a flat horizontal table and a two-dimensional array of vertically disposed spaced-apart rods mounted to be vertically movable in relation to said table and protruding upwards through said table. The table has upper and lower table surfaces through which said rods protrude upwards. There is a working clearance between each of said rods and each of said surfaces. Said first and second horizontal surfaces define therebetween a plenum chamber. Means are provided for admitting air under pressure to said chamber whereby to produce an upward flow of air through said clearances between each of said rods and said upper sable surface to prevent the ingress of debris from a workpiece supported by said rods. The rods are pushed upwards by means of helical springs arranged below said plenum chamber. A fixing mechanism is provided for fixing each rod to a frame of the table, separately.

OBJECT OF THE INVENTION

It is a object of the Invention to improve the function of a work-holding device having a clamping jaw with a plurality of clamping pins directly arranged side-by-side.

SUMMARY OF THE INVENTION

The Invention provides a work-holding device for clamping a workpiece; the work-holding device having a clamping jaw; the clamping jaw comprising a multitude of clamping pins; the clamping pins being circular in cross section, aligned in parallel and laterally directly adjacent to one another, separately movable in their direction of main extension; the clamping jaw also comprising a frame; the frame laterally encompassing the clamping pins, a fixing mechanism being provided for fixing said clamping pins with regard to each other and to said frame by means of a lateral fixing force; wherein the clamping jaw further comprises an open pressure chamber; the pressure chamber being provided at the backside of said clamping pine turned away from said workpiece; pressure medium being supplied to the pressure chamber; parts of the pressure medium emerging from said pressure chamber to said workpiece through clearances between said clamping pins; the pressure medium in the pressure chamber impinging said clamping pins in direction towards the workpiece.

The pressure medium getting out over the clearances between the clamping pins prevents the penetration of debris between the clamping pins. The cleaning effect of the pressure medium getting out of the open compression chamber is not only given in case of the clamping pins being fixed but also given in case of the fixing of the clamping pins being disconnected. With the pressure medium getting out through the clearances between the clamping pins to the workpiece, it is also possible to cool the workpiece during a heat exhibiting treatment of the workpiece. For maximum utilization of this effect a coolant can be used as the pressure medium.

Extending the clamping pins, i.e. putting the clamping pins against the workpiece, in their unfixed condition is accomplished by means the pressure medium in the pressure chamber. Because of the fixing of the clamping pins in the frame by means of the lateral fixing force it does not matter, if all of the clamping pins are admitted by way of one common pressure chamber. After fixing the clamping pins by means of the fixing force, the pressure chamber has no more influence on the position of the clamping pins with regard to the frame.

Preferably, the clamping pins are made of at low cost commercially available cylindrical pins with backward tapped holes. As so far as commercial cylindrical pins are, in single machining steps, subjected to a shaping which is not necessary for the clamping pins according to the invention, these shaping steps should be omitted for cost savings.

The clamping pins of circular cross section can be arranged in the frame in a close packing. With regard to the obtainable level of fixture of the clamping pins in their direction of main extension, this arrangement is preferred as compared to a square packing.

In case of a square packing of the clamping pins the clearances between the clamping pins are particularly big. To a certain extend it is possible to fill up these clearances with filling pins. The filling pins also have a circular cross section, but a smaller diameter than the clamping pins. The smaller diameter is to be selected in such a manner, that no appreciable lateral forces between two neighbouring lines of clamping pins occur. Besides, the charging pins can be shorter than the clamping pins, so that they are normally not involved in carrying the respective workpiece. Thus, they exclusively serve as a delimitation means for the clearances remaining between adjacent clamping pins.

A common translational operating element can be employed both for a fixing mechanism which applies the lateral fixing force on the clamping pins and for a clamping mechanism which pushes the clamping jaw forward to the respective workpiece. The operating element fixes the clamping pins with regard to each other as soon as they have been put against the workpiece so that a increased resistance reacts against a further advance of the clamping jaw. The clamping pins are already laterally compressed to a certain extend, while the clamping jaw is pushed forward via gear means attached to the operating element. However, this lateral force, which lies below the fixing force, is not disadvantageous. It rather eliminates every lateral play of the clamping pins, so that the clamping pins do not move in lateral direction with regard to the workpiece, which prevents the danger of a damaging the workpiece. The common translational operating element for the fixing mechanism and the clamping mechanism provides an extremely simple construction for a control of the new work-holding device also.

The gear means are preferably formed in such a way, that the fixing force on the clamping pins is greater than the clamping force on the clamping jaws. This is important as soon as the clamping pins have been put against the workpiece, because only then a reactio is given to the clamping force.

Suitable as gear means are, for example, sliding surfaces, which are angularly orientated to the translational operating element, and via which the translational operating element orientated in clamping force direction acts upon a pressure piece of the fixing mechanism. Building up the gear means is likewise possible with one or more lever arms angularly orientated to the translational operating element, which are linked to the translational operating element and the pressure piece of the fixing mechanism.

Particularly preferred are embodiments of the new work-holding device in which the clamping jaws are divided into two sectional jaws symmetrically arranged on both sides of the translational operating element, each sectional jaw having one frame laterally encompassing the clamping pins. The fixing forces required for both clamping jaws run in opposite directions and cancel out each other, and no support is necessary for the translational operating element lateral direction.

According to the state of the art, the frame of the invention is preferably rectangular. But on principle, circular or elliptic frame are also possible.

The pressure piece of the fixing mechanism operates preferably on a wall of the frame surrounding the clamping pins, which contrary to the residual frame is slidable.

For adaptation to workpieces with extreme shapes, i.e. with shapes, which have a quite different distance to the plane defined by the frame, it is useful, if the clamping pins are separately exchangeable against clamping pins of another length. Thus, the clamping pins do not need to cover the whole difference in distance by means of displacements with regard to one another; such displacements tend to reduce the contact areas between the clamping pins which extend across the whole frame.

At least one of the clamping pins can be associated to a positioning device or a distance sensor, for example to detect the relative position of a workpiece with regard to the frame or to get a measure of utilization of the full travel of the clamping pins with regard to the frame.

Due to reasons of weight it can be advantageous not to make the clamping pins of the work-holding device of metal but of a hard plastic. Apart from that, plastic is qualified for example for forming the tips of metallic clamping pins, to avoid damages of particularly sensitive surfaces of a workpiece. Easily deformable plastics are preferred here. The tips of the clamping pins can also be provided with electromagnets or vacuum suckers to impose an additional attractive force on the respective workpiece.

BRIEF DESCRIPTION OF THE DRAWINGS

In the following the invention is explained and described detailed by means of preferred embodiments. In the Figures, FIG. 9 is a top view of a clamping jaw of a further embodiment of a work-holding device according to the invention, FIG. 10 is a longitudinal section of an arrangement of clamping pins with different length, FIG. 11 is a side view of a pair of clamping jaws with clamping pins in a further embodiment of the work-holding device according to the invention.

DETAILED DESCRIPTION OF THE PREFERRED EMBODIMENTS

Figure 1:
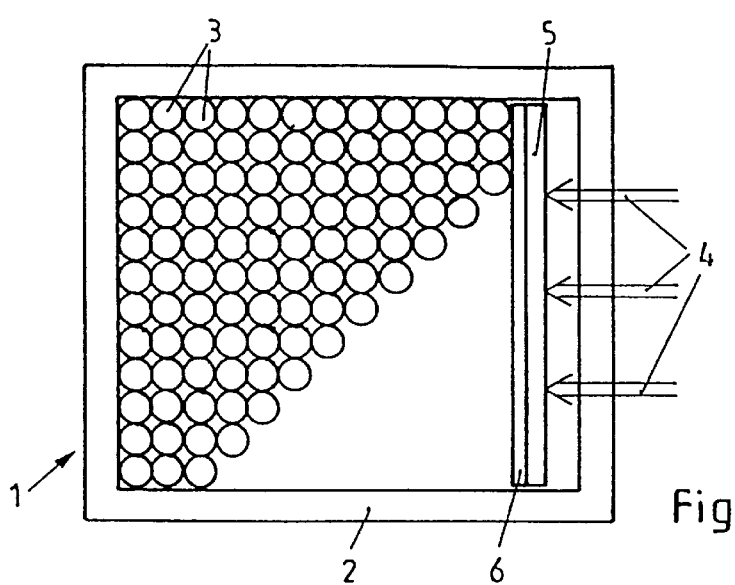
FIG. 1 is a top view of a clamping jaw of a work-holding device according to invention with clamping pins in square packing.

Referring to FIG. 1, a clamping jaw of a work-holding device comprises a rectangular frame 2 and a multitude of clamping pins 3 arranged in the frame 2. The clamping pins 3 are pressed to one another and to the frame 2 by a lateral fixing force 4 running perpendicularly to the direction of main extension of the clamping pins 3, and thereby fixed with regard to the frame 2. The lateral fixing force 4 is transmitted via a wall 5 of the frame 2 to the clamping pins 3. The wall 5 is furnished with an elastic deformable but relatively stiff covering turned towards the clamping pins 3 for constantly distributing the fixing force 4 over the whole width of the wall 5. Contrary to the illustration of FIG. 1 the clamping pins 3 fill up the vacant cross section of the frame 2 up to the wall 5. If the lateral fixing force 4 acting upon the wall 5 is removed, the clamping pins 3 are separately or altogether moveable perpendicular to the drawing plane with regard to the frame 2. In this way the whole of the clamping pins 3 can be adjusted to a three-dimensional shaped workpiece. Considering this adjustment fixed by means of the application of the fixing force 4, a quasi negative mould of the workpiece is be produced.

Figure 2:
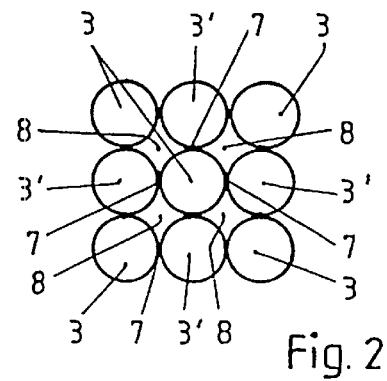
FIG. 2 is an enlarged representation of the packing of the clamping pins in the clamping jaw according to FIG. 1.

According to FIG. 1 the clamping pins 3 are disposed in a square packing inside the frame 2. This is shown enlarged in FIG. 2. In a square packing, each clamping pin 3 has four directly neighboured clamping pins 3'. The contact areas between the one clamping pin 3 and the neighboured clamping pins 3' are line shaped and run perpendicular to the drawing plane. Between the one clamping pin 3 and the neighboured clamping pins 3' clearances 8 remain adjacent to the clamping pin 3, which in case of the square packing are relatively big. These clearances 8 are intentionally left because debris, which can get in between the clamping pins 3, is laterally displaceable into these clearances 8. Debris displaced in the clearances does not hinder the fixing of all of the clamping pins 3 to one another and to the frame 2. The displacement of the debris out of the contact area 7 into the clearances 8 takes place automatically, because debris in the contact area 7 means an unstable equilibrium during pressing neighboured clamping pins 3, 3' against each other. Even small changes of the position of the adjacent clamping pins 3, 3' press the debris laterally into one of the neighboured clearances 8.

Filling pins 9 can be arranged in the clearances 8 for a better lateral guidance of the clamping pins 3. This is out-lined in FIG. 3. The filling pins 9 have a smaller diameter than the clamping pins 3 and they can also be made shorter. The filling pins 9 do not completely fill up the clearances 8. Thus, a sufficient volume for displacing debris remains.

Figure 4:
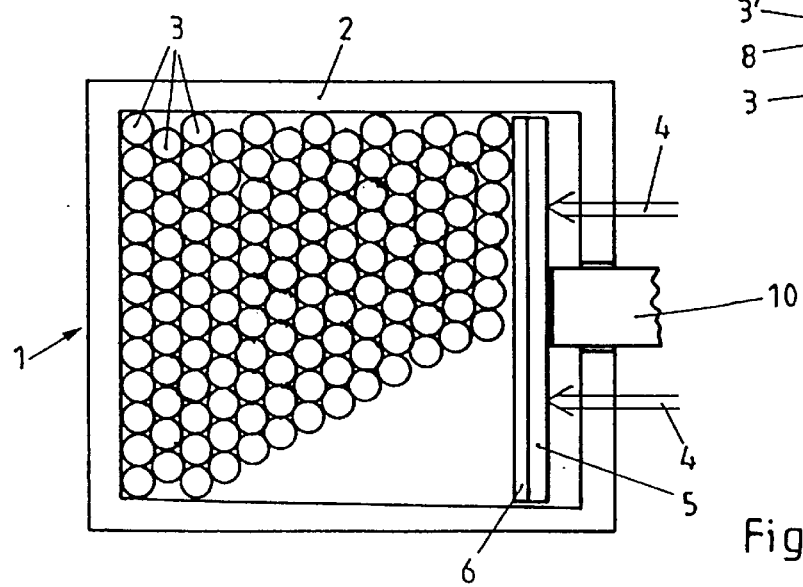
FIG. 4 is a top view of a clamping jaw of another work-holding device according to the invention with clamping pins in a closed packing.

Sufficient volume for displacing debris is also given in the embodiment of the clamping jaw 1 according to FIG. 4, in which the clamping pins 3 are arranged in the frame 2 in a close packing. Moreover, the embodiment of the clamping jaw 1 according to FIG. 4 differs from that according to FIG. 1 in that the vacant cross section of the frame 2 cross to the direction of the fixing force 4 decreases in direction of the fixing force 4, whereby the clamping pins 3 are additionally pressed together and fixed in this direction. Nevertheless, a pressing and fixing in this direction also results from the arrangement according to FIG. 1, because the single lines of the clamping pins 3 tend to yield laterally if loaded with the fixing force 4. Furthermore, in FIG. 4 there is shown a pressure piece 10 for transferring the fixing force 4 to the wall 5 of the frame 2. Also contrary to the representation in FIG. 4 the clamping pins 3 fill the vacant cross section of the frame 2 up to the wall 5.

Figure 5:
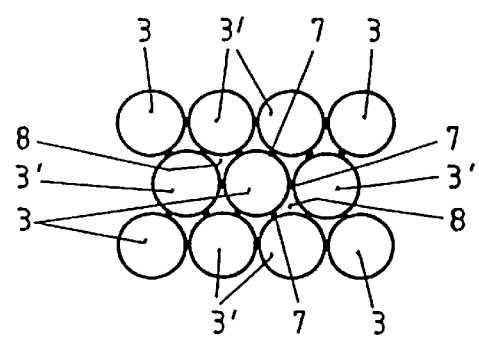
FIG. 5 is an enlarged representation of the packing of the clamping pins in the clamping jaw according to FIG. 4.

The close packing of the clamping jaws 3 according to FIG. 4 is illustrated enlarged in FIG. 5. Six further clamping pins 3' are associated as next neighbours to a central clamping pin 3. The contact areas 7 of the clamping pins 3 are again line-shaped. However, the clearances 8 between the clamping pins 3 are considerably smaller than in case of the square packing according to FIG. 2. Thus, the volume of the clearances 8 can be filled up faster with debris. Additionally, for reasons of multiple support of the clamping pins 3 by their neighbours 3', a less great tendency for displacing debris out of the contact areas 7 into the clearances 8 is given. As a result, there is a little danger of debris penetrating between the clamping pins 3 causing an uneven distribution of the fixing force over the clamping pins 3. This may have the effect that single clamping pins 3 are not sufficiently fixed.

Figure 3:
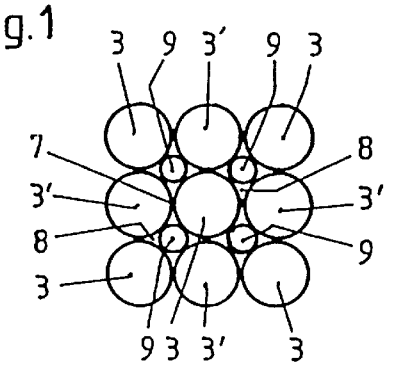
FIG. 3 is a illustration corresponding to FIG. 2 of a modified packing of the clamping pins with additional filling pins.
Figure 6:
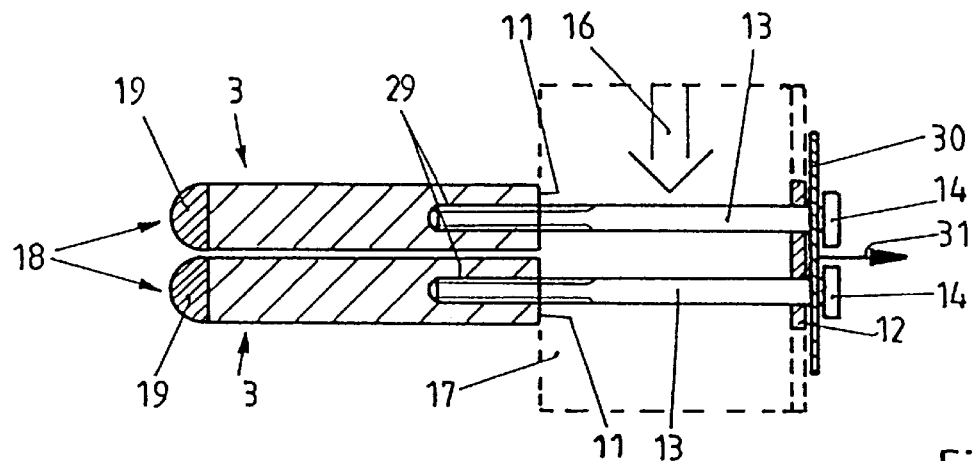
FIG. 6 is a cross section of two adjacent clamping pins.

FIG. 6, which shows two neighboured clamping pins 3 in longitudinal section, illustrates how these clamping pins 3 are secured to the frame 2 according to FIG. 3 (not shown here), and how they are admitted to a workpiece 25 to be held, even if the fixing force for fixing the clamping pins 3 with regard to the frame is removed. Each clamping pin 3 is made of a cylindrical pin having a backward tapped whole 29, into which a retaining bar 13 is screwed in through a pierced retaining plate 12. Backward of the retaining plate 12, the retaining bars 13 comprise retaining collars 14, which are not able to get through the retaining plate 12. Thus, securing of the clamping pins 3 to the retaining plate 12 is effected. The retaining plate 12 is arranged stationary with regard to the frame 2. A pressure chamber 17, which is admittable with a pressure medium 16, is provided between the clamping pins 3 and the retaining plate 12. The pressure medium 16, for example compressed air or a liquid coolant, in the pressure chamber 17 pushes the clamping pins 3 away from the retaining plate 12 via radial steps 13 of the clamping pins. Moreover, a portion of the pressure medium 16 gets out of the pressure chamber 17 via the clearances 8 between the clamping pins 3 and thereby cleans the clearances 8 of debris. Besides, the pressure medium 16 getting through the clearances 8 can also be used for continuously cleaning and/or cooling a workpiece. The tips 18 of the clamping pins 3 are formed of a soft elastically deformable plastic 19. An additional return plate 30 is arranged between the retaining plate 12 and the retaining collars 14. In withdrawing the return plate 30 in direction of arrow 31 by a here not shown hydraulic or pneumatic mechanism, for example, all clamping pins are withdrawn. Thus, a workpiece can set free and changed without travelling the whole clamping jaw. The new workpiece is grasped by the clamping pins 3, when the retaining plate 12 is again pushed forward in direction against arrow 31.

Figure 7:
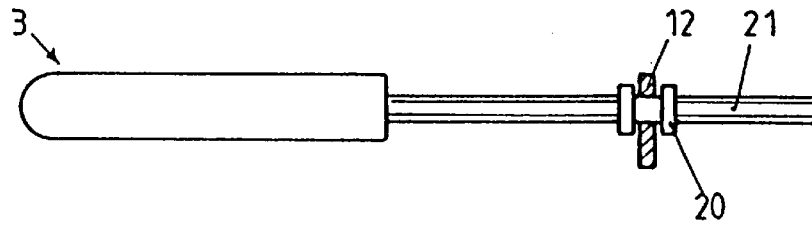
FIG. 7 is a cross section of a clamping pin with an adjusting mechanism.

In FIG. 7 a clamping pin 3 is shown, which is neither freely moveable nor moveable against spring pressure with regard to the retaining plate 12. Rather, a threaded rod 21 is attached to the backside of the clamping pin 3 according to FIG. 7, and a threaded ring 20, which is rotatable but stationary with regard to the retaining plate 23, sits on said threaded rod 21. By turning the threaded ring 20 the clamping pin 3 according to FIG. 7 moves with respect to the frame 2 into a defined relative position. Thus, the clamping pin 3 can form a trip dog for approaching the clamping jaw 1 to a workpiece 25.

Figure 8:
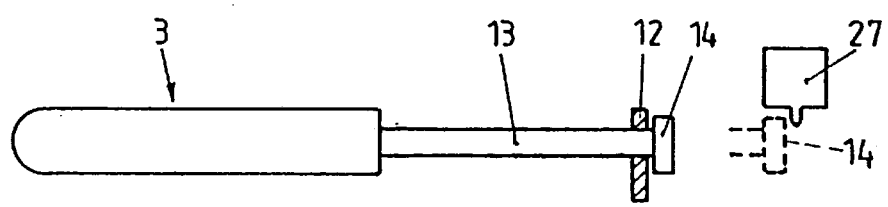
FIG. 8 is a cross section of a clamping pin with a distance sensor.

In FIG. 8, a clamping pin 3 is illustrated, with which the relative position of a workpiece can be determined with regard to the clamping jaw 1. For the registration of the position of the workpiece, a microswitch 27 is arranged behind the retaining plate 12, which is actuated by the retaining collar 14, when the clamping pin 3 is to a certain extend pushed backward to the retaining plate 12. Instead of the microswitch 27 a distance sensor can also be provided, which detects the exact relative position of the clamping pins 3 with regard to the retaining plate 12.

FIG. 9 shows an embodiment of the clamping jaw 1 with a slotted circular frame 2. The fixing force 4 for fixing the clamping pins 3 in the frame 2 is applied via the pressure piece compressing the free ends of the frame a. The resulting fixing force 4 is oriented radially to the center of the frame 2.

In FIG. 10, a bunch of clamping pins 3 is shown in cross section, which could be arranged in the frame 2 according to FIG. 9. The clamping pins 3 of the bunch are of different length, and because of that they are matched, for example, for holding a rounded workpiece. In the center of the bunch illustrated in FIG. 10, the clamping pins 3 would be moved considerably stronger by such a rounded workpiece, if all clamping pins had the same length. This is compensated by means of the different lengths of the clamping pins 3, on purpose.

FIG. 11 out-lines a work-holding device 22 with two clamping jaws 1. The left clamping jaw 1 is constructed as a stationary clamping jaw, and the right clamping jaw 1 is constructed as a drivable clamping jaw to which a clamping force 28 towards the left clamping 1 jaw can be applied. A guide rail 24 is provided between the clamping jaws 1. In the representation according to FIG. 11 an egg-shaped workpiece 25 is held by the work-holding device 22, the clamping pins 3 of both clamping jaws 1 exactly reproducing the external profile of the workpiece 25. As a result, in comparison to flat clamping jaws, not only a much greater retaining surface, but also a positive locking between the clamping jaws 23 and the workpiece 25 are achieved. Further, the position of the workpiece 25 is completely defined by comparatively low forces acting upon its surface.

Figure 12:
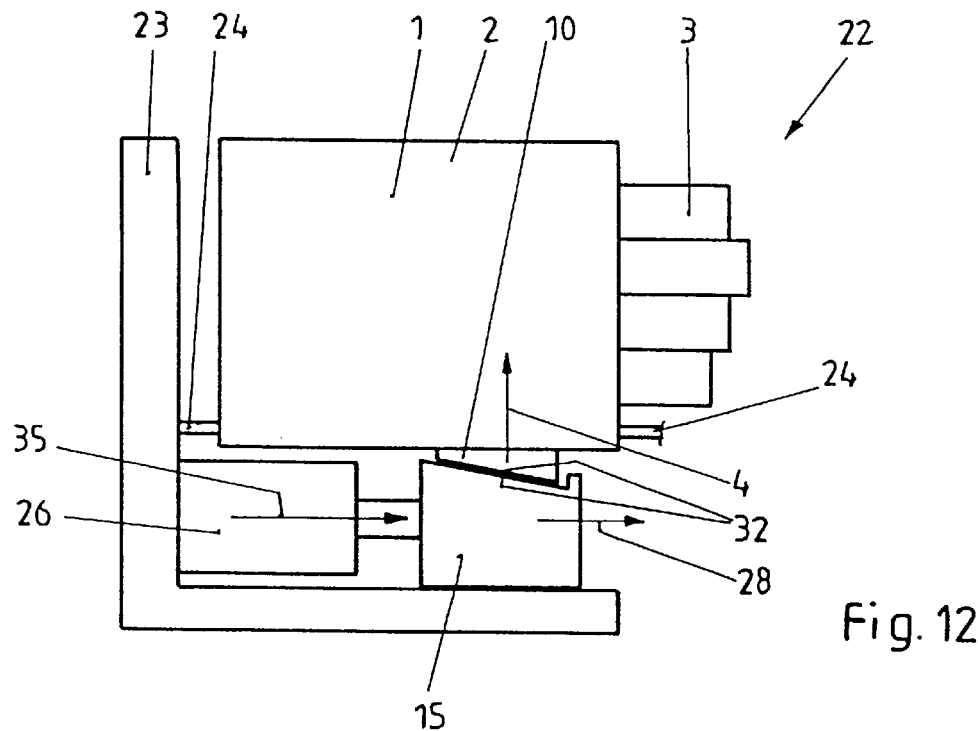
FIG. 12 is a side view of a clamping jaw with details of a fixing mechanism and a clamping mechanism in an embodiment of the work-holding device according to the invention.

The clamping jaw 1 shown in FIG. 12 is with respect to a basis 23 linearly guided in direction of the clamping force 28 by means of guide rails 24. A translational operating element 26, which is a hydraulic or pneumatic double operating cylinder, for example, is provided for pushing forward the clamping jaw 1 in the direction of the clamping force 28. The operating element 26 acts via a control head 15 on the pressure piece 10 of the fixing device for the clamping pins 3 and thus at the same time on the common clamping jaw 1. Between the control head 15 and the pressure piece 10 control surfaces 32 are provided, which are orientated angularly to the translational operating element 26 and to a force 35 originally exerted by the operating element 26. Because of the angular orientation of the control surfaces 32 the force 35 of the operating element 26 is split up into the clamping force 28 and the fixing force 4. With reference to FIG. 12 the reactio to the fixing force 4 is imposed by the basis 23, which supports the control head 15 in downward direction. The distribution of the force 35 results in the following behaviour during clamping with the clamping jaw 1: First of all, the clamping jaw 1 without contact to the workpiece can be pushed still unrestricted forward by the operating element 26. Therefore, neither a worth mentioning clamping force 28 nor a fixing force 4 is built up. At best, the clamping pins 3 are admitted laterally so that they loose their lateral play. But, of course, they are still movable in their direction of main extension. As soon as the clamping pins 3 impinge upon the workpiece 25 and are pressed against their restoring force into the clamping jaw 1, the clamping force 28 increases. By arrangement of the control surfaces 32 an even greater fixing force 4 results simultaneously, so than the clamping pins, just as they are put against the workpiece, are fixed to one another. The force 35 of the operating element 26 is borne essentially laterally by the clamping pins, so that it can not result in a damage of the workpiece surface. The hooked formation of the control head 15 as shown in FIG. 12 ensures, that the operating element 26 can also withdraw the clamping jaw 1. But it is also possible, that in unloading of the operating element 26 at first the fixture of the clamping pins is removed only.

According to the arrangement of the work-holding device 22 of FIG. 12 the reactio to the fixing force 4 has to be borne by the basis 23. Now referring to the embodiment according to FIG. 13, the reactio is also used for fixing of clamping pins 3. To this end, the clamping jaw 1 is formed two-piece, two sectional jaws 1' and 1" being arranged symmetrically to the translational operating element 26. Correspondingly, the control head 15 is also formed symmetrically and admits the pressure pieces 10 of both sectional jaws 1' and 1" with opposite fixing forces 4 neutralizing each other. Thus, no support of the control head 15 perpendicular to the direction of the force 35 of the translational operating element 26 is necessary.

Figure 13:
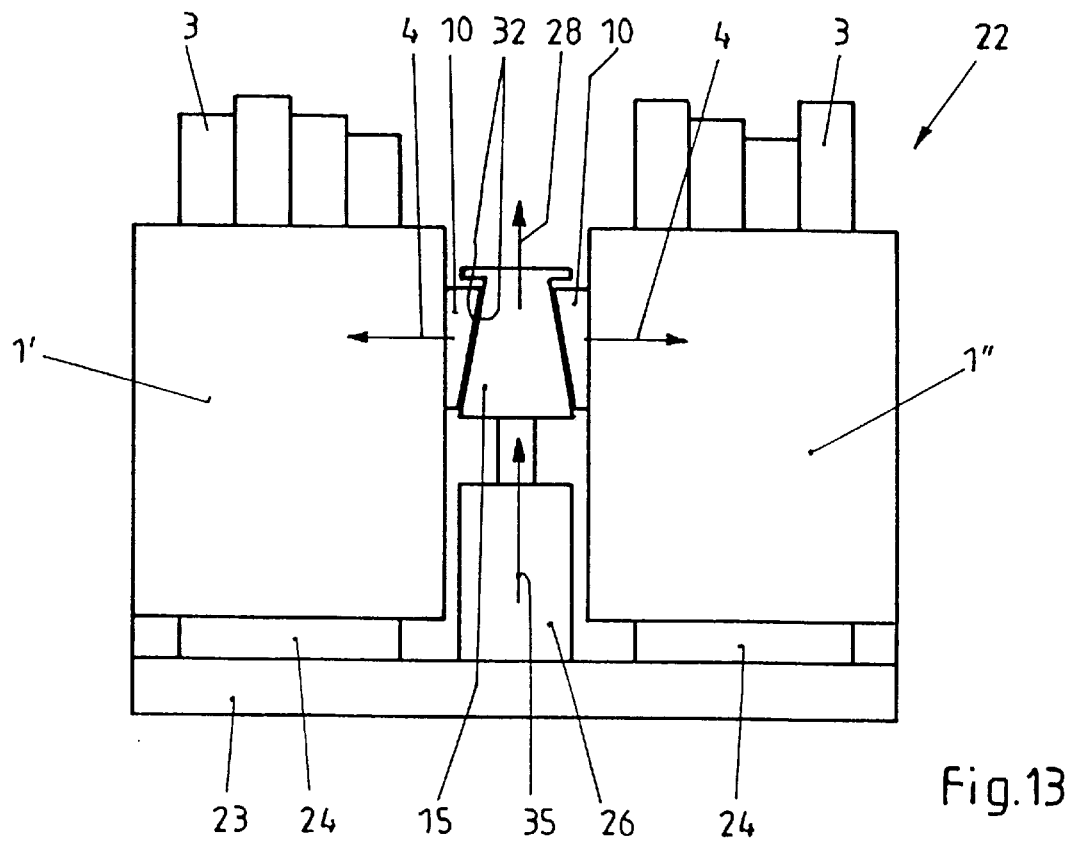
FIG. 13 is a top view of a two-piece clamping jaw with details of the fixing mechanism and the clamping mechanism in an embodiment of the work-holding device symmetrically supplemented with regard to FIG. 12.
Figure 14:
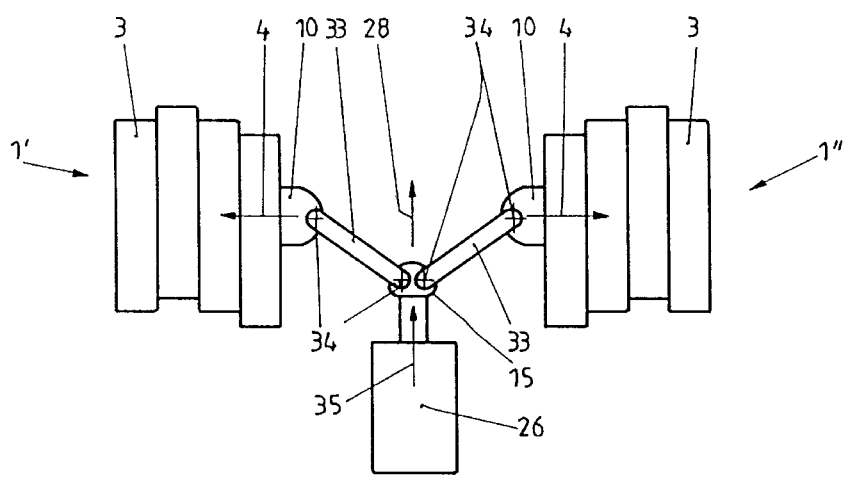
FIG. 14 is a schematic illustration of the fixing mechanism and the clamping mechanism in a modified embodiment of the work-holding device according to FIG. 13.

This necessity is also not given in the arrangement according to FIG. 14, in which only the translational operating element 26, the pressure pieces 10 of the two fixing mechanism for the clamping pins 3 of the two sectional jaws 1' and 1" and the gear means provided between the operating element 26 and the pressure pieces 10 are shown. Here, the gear means comprise two lever arms 33, which are in a symmetrical arrangement pivoted to the control head 15 and to both of the pressure pieces 10 about lever arm axes 34. Like the control surfaces 32 according to FIGS. 13 and 14 the lever arms 33 translate the force 35 of the translational operating element 26 into the clamping force 28 parallel to the force 35 and the fixing forces 4 perpendicular to the force 35. The attachment of the lever arms 33 to the control head 15 as well as to the pressure pieces 10 also enables a pull back of the clamping jaws 1 by contracting the operating element 26. An advantage of the arrangement according to FIG. 14 compared to the arrangement according to the FIGS. 12 and 13 is, that by means of the lever arm 33 arranged like a knee-joint an interesting change of the ratio of the clamping force 28 to the fixing forces 4 can be obtained. If the pressure pieces 10 move somewhat laterally with increasing growing fixing forces 4, the angle between the lever arms increases. Subsequently, the clamping force 28 portion of the force 35 decreases for the benefit of the fixing force 4. This dynamic distribution of force is optimal.

Reference List

1—clamping jaw
2—frame
3—clamping pin
4—fixing force
5—wall
6—covering
7—contact area
8—clearance
9—filling pin
10—pressure piece
11—step
12—retaining plate
13—retaining bar
14—retaining collar
15—control head
16—pressure medium
17—pressure chamber
18—tip
19—plastic
20—threaded ring
21—threaded rod
22—work-holding device
23—basis
24—guide rail
25—workpiece
26—operating element
27—microswitch
28—clamping force
29—tapped hole
30—return plate
31—arrow
32—sliding surface
33—lever arm
34—lever arm axis
35—force

We claim:

1. A work holding device for clamping a workpiece, said work holding device comprising:
   at least one clamping jaw including;
      a multitude of clamping pins, said clamping pins each having a substantially circular cross section, a direction of main extension, a front side facing a workpiece, and a backside facing away from the workpiece, said clamping pins being arranged parallel to and laterally directly adjacent to one another to define clearances therebetween, said clamping pins being separately movable in a longitudinal direction along their direction of main extension;
      a frame laterally encompassing said clamping pins;
      a fixing mechanism configured and arranged to fix said clamping pins with respect to one another and with respect to said frame by applying a lateral fixing force to said clamping pins;
      a pressure chamber disposed at said backside of said clamping pins, said pressure chamber being open through said clearances between said clamping pins and being adapted to receive a pressure medium, the pressure medium urging said clamping pins in a direction toward the workpiece with a portion of the pressure medium emerging from said pressure chamber to the workpiece through said clearances between said clamping pins.

2. The work-holding device of claim 1, wherein the pressure medium supplied to said pressure chamber is compressed air.

3. The work-holding device of claim 1, wherein said pressure medium supplied to the pressure chamber is a coolant.

4. The work-holding device of claim 1, wherein said clamping ping are arranged in a close packing.

5. The work holding device of claim 1 further comprising a clamping mechanism for applying a clamping force directed to a workpiece located on said clamping jaw; a common translational operating element for both said fixing mechanism and said clamping mechanism; and means coupled to said common translational operating element for transforming a force exerted by said operating element into the fixing force and the clamping force.

6. The work holding device of claim 5, wherein said means transforms the force exerted by said operating element into a relatively greater fixing force and a relatively smaller clamping force.

7. The work-holding device of claim 6, wherein said means includes sliding surfaces angularly orientated to said translational operating element.

8. The work-holding device of claim 6, wherein said gear means includes at least one lever arm angularly orientated to said translational operating element.

9. The work-holding device of claim 5, wherein said clamping jaw is subdivided into two sectional jaws, said sectional jaws being symmetrically arranged to said translational operating element, and each sectional jaw having one frame laterally encompassing its share of said clamping pins.

10. The work-holding device of claim 1, wherein said frame has rectangular internal dimensions, said fixing mechanism applying the fixing force on a wall of said frame, which is movable with regard to the residual frame.

11. A work holding device as claimed in claim 1 and further comprising retaining bars each projecting into the backside of one of said clamping pins and extending through said pressure chamber, wherein a radial step is formed by a portion of said backside of each of said clamping pins.

12. A clamping jaw for clamping workpieces, said clamping jaw comprising:
    a multitude of clamping pins, said clamping pins having a substantially circular cross section, a front side facing toward a workpiece, and a backside facing away from the workpiece, said clamping pins having a direction of main extension and being arranged parallel to and laterally directly adjacent to one another to define clearances therebetween, said clamping pins being separately movable in a longitudinal direction along their direction of main extension;

a frame laterally encompassing said clamping pins;

a fixing mechanism configured and arranged to fix said clamping pins with respect to one another and with respect to said frame by application of a lateral fixing force to said clamping pins; and a pressure chamber disposed at said backside of said clamping pins, said pressure chamber being adapted at least partially to contain a pressure medium supplied thereto, the pressure medium urging said clamping pins in a direction toward a workpiece and a portion of the pressure medium flowing from said pressure chamber toward the workpiece through said clearances defined between said clamping pins.

* * * * *